(12) United States Patent
Zhou et al.

(10) Patent No.: US 9,325,366 B1
(45) Date of Patent: Apr. 26, 2016

(54) APPARATUS FOR PROTECTING AND MOUNTING A PERSONAL ELECTRONIC DEVICE HAVING A CAMERA

(71) Applicant: Hills Forest LLC, Millwood, NY (US)

(72) Inventors: Li Zhou, Chappaqua, NY (US); Hongchao Wang, Chappaqua, NY (US)

(73) Assignee: Hills Forest LLC, Millwood, NY (US)

( * ) Notice: Subject to any disclaimer, the term of this patent is extended or adjusted under 35 U.S.C. 154(b) by 0 days.

(21) Appl. No.: 14/676,564

(22) Filed: Apr. 1, 2015

(51) Int. Cl.
*H04M 1/00* (2006.01)
*H04B 1/3888* (2015.01)
*H04M 1/11* (2006.01)

(52) U.S. Cl.
CPC .............. *H04B 1/3888* (2013.01); *H04M 1/11* (2013.01)

(58) Field of Classification Search
CPC ............ H04M 2250/52; H04M 1/0264; G06F 1/1686; G06F 2200/1633; G06F 2200/1634; H04B 1/3877
USPC ...................................... 455/575.8
See application file for complete search history.

(56) References Cited

U.S. PATENT DOCUMENTS

| 8,457,701 | B2 * | 6/2013 | Diebel ...................... 455/575.8 |
| D710,598 | S | 8/2014 | Morgan et al. |
| 2006/0124676 | A1 | 6/2006 | Mastrosimone |
| 2013/0184033 | A1 | 7/2013 | Willenborg |
| 2013/0251330 | A1 | 9/2013 | Willenborg |
| 2013/0288743 | A1 * | 10/2013 | Hunt et al. ................. 455/556.1 |
| 2014/0066144 | A1 | 3/2014 | Hong |
| 2014/0128130 | A1 | 5/2014 | Chiu |

* cited by examiner

*Primary Examiner* — Eugene Yun
(74) *Attorney, Agent, or Firm* — Byrne Poh LLP

(57) ABSTRACT

An apparatus for protecting and mounting a smartphone is provided, comprising: a case comprising: a front cover comprising: a frame; a screen protector coupled to the frame so as to contact a touchscreen of the smartphone; a first plurality of cushions disposed on the interior of the frame so as to contact the sides of the smartphone; and a protrusion, having an aperture, that extends from the exterior of the frame; and a rear cover comprising: a panel; a ridge extending from the interior surface of the panel to engage the interior of the frame when operatively coupled; a second plurality of cushions disposed so as to contact a surface of the smartphone opposite the touchscreen; an aperture through the panel; and optics within the aperture substantially aligned with the a camera of the smartphone.

19 Claims, 7 Drawing Sheets

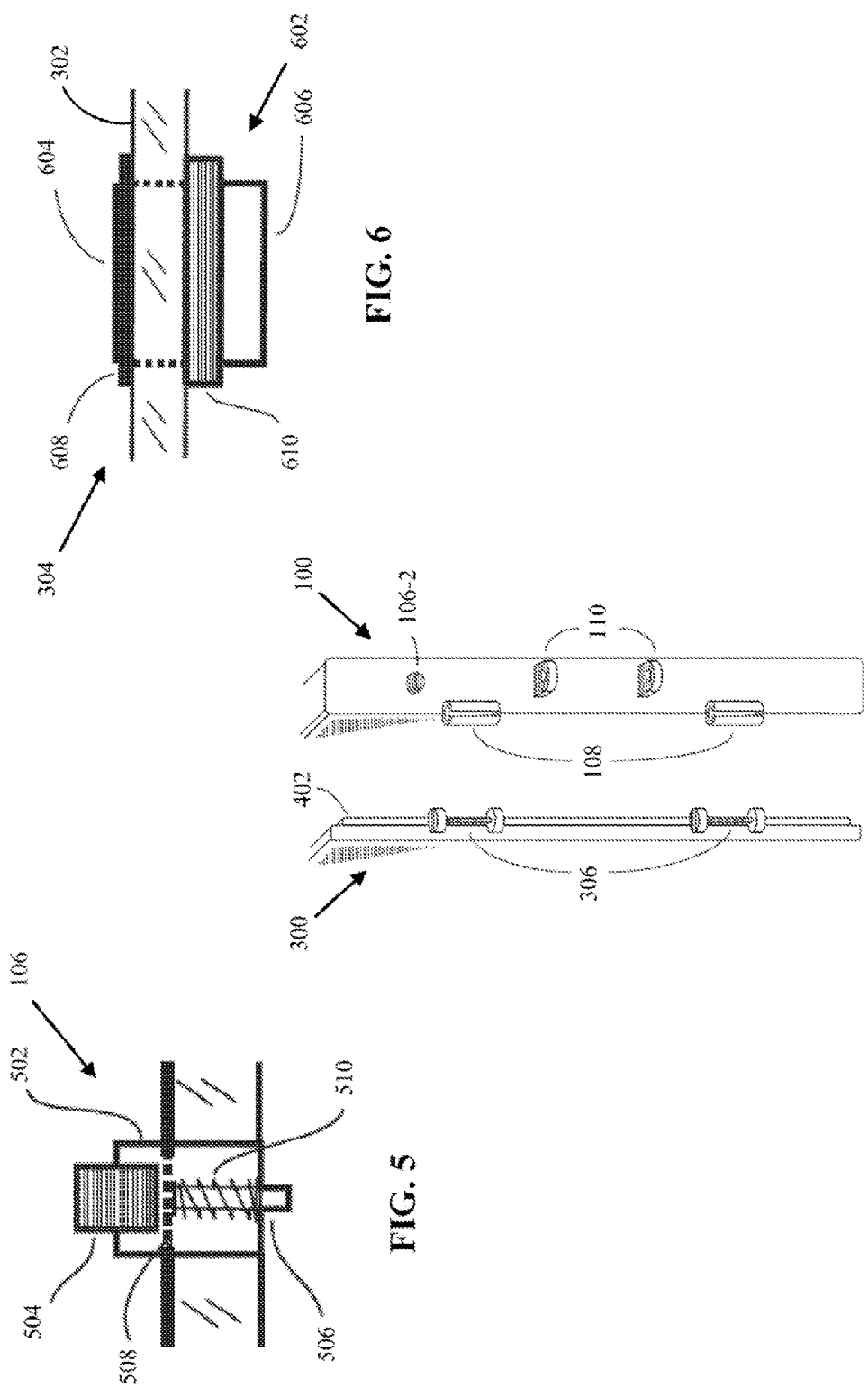

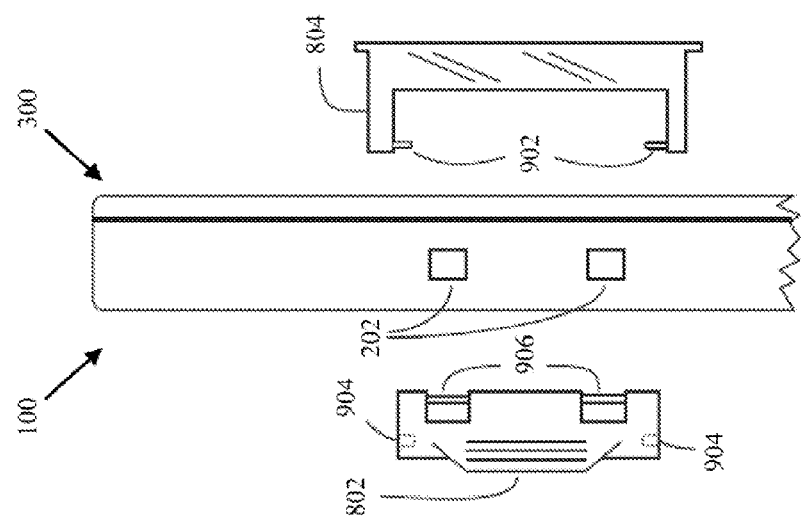
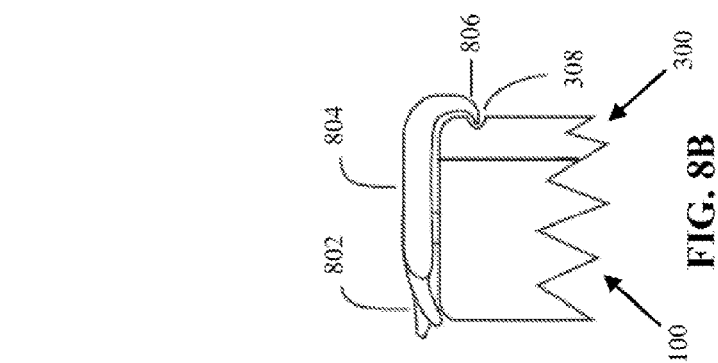
FIG. 8A
FIG. 8B
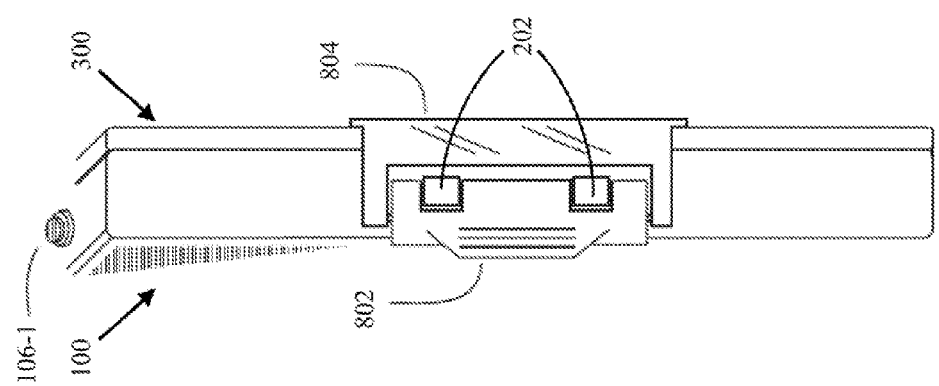
FIG. 9

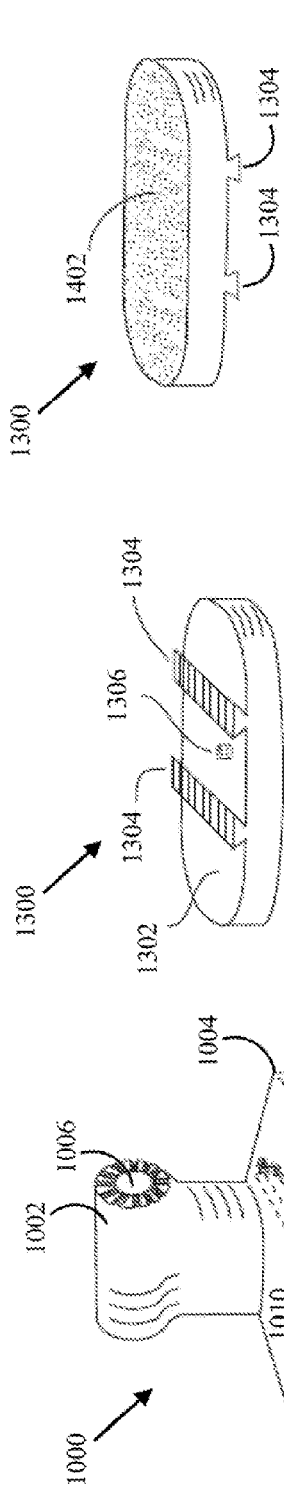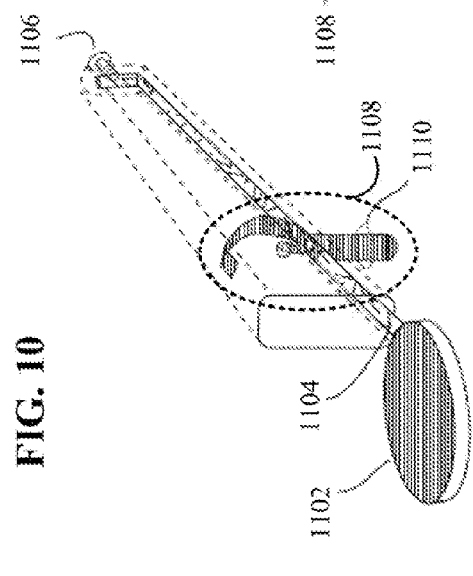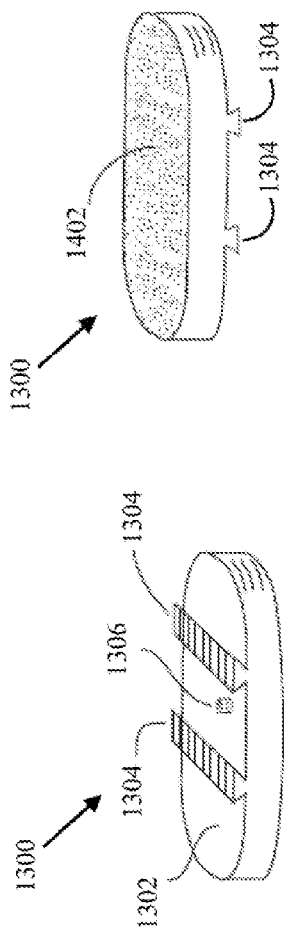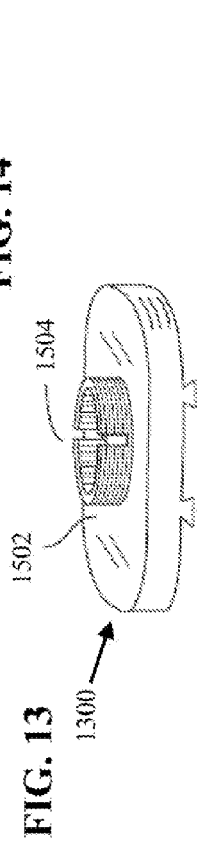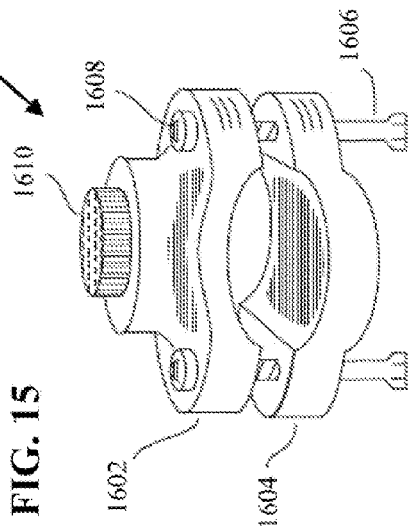

APPARATUS FOR PROTECTING AND MOUNTING A PERSONAL ELECTRONIC DEVICE HAVING A CAMERA

TECHNICAL FIELD

The disclosed subject matter relates to apparatus for protecting and mounting a personal electronic device having a camera.

BACKGROUND

In recent years, the popularity of using action cameras mounted on a user and/or the user's equipment to capture images and/or video of a user's exploits have become increasingly popular. Action cameras are typically video cameras that are specifically designed to be rugged and to easily attach to a user's helmet or other equipment. These action cameras can be relatively expensive devices to buy, and it can take time for a user to learn how to use the action camera. However, most users own a mobile phone that is capable of capturing high quality images and video. Thus, if the user could use their mobile phone as an action camera, it would obviate the need for many users to buy a dedicated action camera. Typically, mobile phones are susceptible to damage when dropped or exposed to water, dirt, etc., making them ill-suited for use as an action camera. Mobile phones are also difficult to mount on a user or the user's equipment.

Accordingly, it is desirable to provide apparatus for protecting and mounting a personal electronic device having a camera.

SUMMARY

In accordance with various embodiments of the disclosed subject matter apparatus for protecting and mounting a personal electronic device having a camera are provided.

In accordance with some embodiments of the disclosed subject matter, an apparatus for protecting and mounting a personal electronic device having a camera is provided, the apparatus comprising: a case comprising: a front cover comprising: a frame having an exterior and an interior; a screen protector coupled to the frame such that when the personal electronic device is positioned within the frame, the screen protector contacts a touchscreen of the personal electronic device; a first plurality of cushions disposed on the interior of the frame such that when the personal electronic device is positioned within the frame, the first plurality of cushions contact the sides of the personal electronic device; and a protrusion that extends from one side of the exterior of the frame, wherein the protrusion has an aperture; and a rear cover comprising: a panel having an exterior surface and an interior surface; a ridge extending from the interior surface of the panel such that the ridge engages the interior of the frame when the front cover is operatively coupled to the back cover; a second plurality of cushions disposed on the interior surface of the panel such that when the personal electronic device is positioned within the frame and the front cover is operatively coupled to the back cover, the second plurality of cushions contact a surface of the personal electronic device that is opposite the touchscreen; an aperture extending through the panel from the exterior surface to the interior surface; and optics disposed within the aperture such that the camera of the personal electronic device is substantially aligned with the optics when the personal electronic device is positioned within the frame; and a mounting assembly comprising: a neck portion having an aperture that is used to couple the front cover to the neck portion via a fastener inserted through the aperture of the protrusion and the aperture of the neck portion; a base portion having a mounting surface and an elongate slot in the mounting surface; a hollow portion extending from an exterior of the base portion into an interior of the base portion; and a lever disposed at least partially within the hollow portion.

In some embodiments, the base portion has an aperture that extends from the interior of hollow portion to the exterior of the mounting surface, wherein the mounting assembly further comprises a pin coupled to the lever and extending at least partially through the aperture that extends from the interior of the hollow portion to the exterior of the mounting surface.

In some embodiments, the lever and pin are biased such that in a resting position, an end of the pin that is distal from the lever extends past the mounting surface.

In some embodiments, a cross-sectional shape of the elongate slot is trapezoidal with a narrow side of the parallel sides of the trapezoid at the mounting surface.

In some embodiments, the protrusion comprises one or more ridges extending radially from the aperture of the protrusion, and wherein the neck portion comprises one or more depressions that engage the one or more ridges when the case is coupled to the mounting assembly.

In some embodiments, the front cover further comprises a push button extending through the frame, wherein the push button comprises: a housing; a plunger disposed at least partially within the housing and extending above the exterior of the frame; a pin disposed at least partially within the housing such that actuating the plunger causes the pin to extend in a direction toward the interior of the frame; and a membrane disposed within the housing between the plunger and the pin, wherein the membrane is coupled to the housing such that the membrane forms a water-tight barrier between the plunger and the pin.

In some embodiments, the ridge comprises a silicon O-ring.

In some embodiments, the front cover further comprises a hook and the rear cover further comprises an elongate member coupled to the rear cover such that a longitudinal axis of the elongate member is parallel to a longitudinal axis of the back cover, and wherein the hook engages the elongate member to form a hinge.

In some embodiments, the front cover further comprises a hook, and wherein the case further comprises a toggle hook latch that engages the hook and secures the front cover to the back cover.

In some embodiments, the apparatus further comprises a mounting pad having an elongate tab with a cross-sectional shape that matches at least a portion of the cross-sectional shape of the elongate slot such that when the elongate tab is positioned within the elongate slot the mounting pad is secured to the base portion of the mounting assembly with respect to a force on the mounting apparatus in a direction perpendicular to the mounting surface of the mounting assembly.

In some embodiments, the mounting pad comprises a mounting pin aperture such that the mounting pin rests within the mounting pin aperture when the mounting pad is operatively coupled to the mounting assembly.

In some embodiments, the mounting pad is coupled to a fitting having a threaded exterior surface and an interior surface, wherein a slot extending from the exterior surface to the interior surface runs substantially perpendicular to the threads from an end of the fitting that is distal from the mounting pad toward the mounting pad.

In some embodiments, the apparatus further comprises: a pole mount comprising: an upper portion comprising: a bolt; and an aperture; a lower portion comprising an aperture; and a fastener disposed through the aperture of the upper portion and the aperture of the lower portion.

In some embodiments, the fitting is disposed such that the inter surface of the fitting surrounds at least a portion of the bolt, wherein the apparatus further comprises: a ring nut disposed on the threads of the exterior surface of the fitting, wherein tightening the ring nut decreases a width of the slot causing the interior surface of the fitting to securely engage the bolt.

In some embodiments, with the ring nut loosened the case is rotatable around a central axis of the bolt.

In some embodiments, the case is freely rotatable through three hundred and sixty degrees around the central axis of the bolt.

In some embodiments, the case is configured to engage with the neck portion such that the case is securable at a plurality of angles around a longitudinal axis of the aperture of the neck portion.

In some embodiments, the case is securable at angles around the longitudinal axis of the aperture of the neck portion that differ by at least one hundred and eighty degrees.

In some embodiments, the frame of the front cover further comprises a raised edge that causes the frame to be raised with respect to the screen protector that contacts the touchscreen of the personal electronic device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5 shows a cross-sectional view of a push button depicted in FIGS. 1 and 2 in accordance with some embodiments of the disclosed subject matter.

FIG. 6 shows a cross-sectional view of a camera aperture and optics placed within the camera aperture depicted in FIGS. 3 and 4 in accordance with some embodiments of the disclosed subject matter.

FIG. 7 shows a perspective view of a front cover depicted in FIGS. 1 and 2 and a rear cover depicted in FIGS. 3 and 4 in proximity to one another in accordance with some embodiments of the disclosed subject matter.

FIGS. 8A and 8B show a perspective view and a side view, respectively, of a toggle hook latch for securely enclosing a personal electronic device within a front cover and a rear cover in accordance with some embodiments of the disclosed subject matter.

FIG. 9 shows an exploded view of a latch depicted in FIGS. 8A and 8B in accordance with some embodiments of the disclosed subject matter.

FIG. 10 shows a mounting assembly for mounting a personal electronic device having a camera in accordance with some embodiments of the disclosed subject matter.

FIG. 11 shows a partial view of a base portion of the mounting assembly with details of a lever depicted in FIG. 10 in accordance with some embodiments of the disclosed subject matter.

FIG. 12 shows an exploded view of a mounting pin assembly depicted in FIG. 11 in accordance with some embodiments of the disclosed subject matter.

FIG. 13 shows a perspective view of a mounting pad in accordance with some embodiments of the disclosed subject matter.

FIG. 14 shows a perspective view of an example of a second surface of the mounting pad depicted in FIG. 13 in accordance with some embodiments of the disclosed subject matter.

FIG. 15 shows a perspective view of an example of a second surface of the mounting pad depicted in FIG. 13 in accordance with some embodiments of the disclosed subject matter.

FIG. 16 shows a perspective view of a pole mount assembly in accordance with some embodiments of the disclosed subject matter.

DETAILED DESCRIPTION

In accordance with various embodiments, mechanisms for protecting and mounting a personal electronic device having a camera are provided.

In some embodiments, the mechanisms described herein can include a front cover and a rear cover that together form a case for a personal electronic device having a camera. In some embodiments, the front cover can include a film which contacts a surface of a touchscreen of the personal electronic device to facilitate use of the touchscreen when the personal electronic device is housed in the case. Additionally, in some embodiments, the front cover can include one or more protrusions which can be used to couple the front cover to a mounting assembly. The mounting assembly can, in turn, be mounted to a piece of equipment, such as a helmet, a surfboard, a pole, bicycle handle bars, etc.

In some embodiments, the rear cover can include an aperture that can pass light from outside the case to a camera of the personal electronic device. The location, size and/or shape of the aperture can be determined based on a brand and/or model of the personal electronic device that is to be housed in the case. Additionally, in some embodiments, the front and/or rear covers can include cushions that are located between the case and the personal electronic device when the personal electronic device is housed in the case to provide impact resistance.

In some embodiments, the front cover and the rear cover can, when coupled together to form a case, provide protection for the personal electronic device from falls, submersion in water, dirt and/or other debris and/or other environmental hazards.

Figures 1, 2:
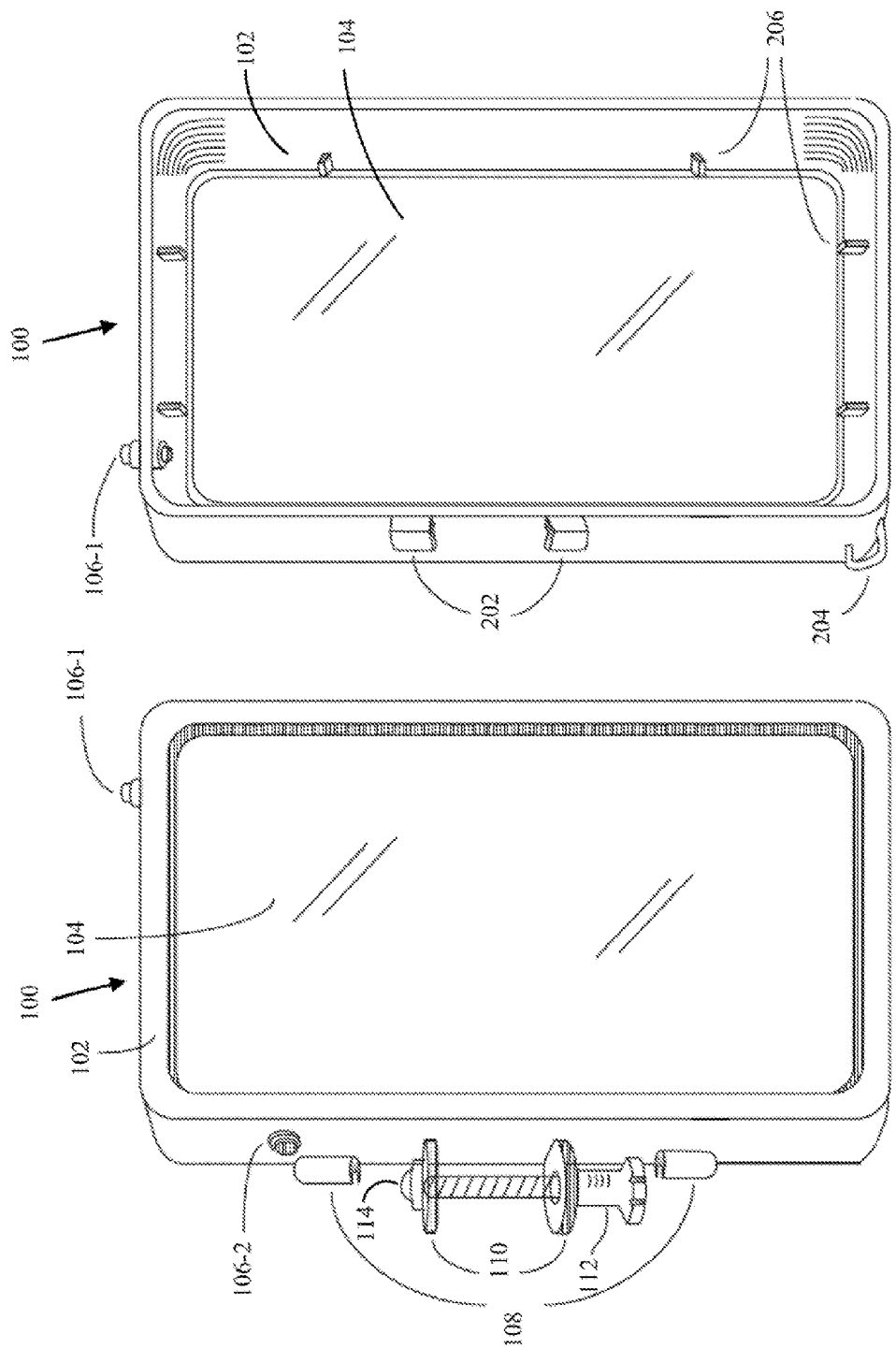
FIG. 1 shows a perspective view of an exterior of a front cover of a case for protecting and mounting a personal electronic device having a camera in accordance with some embodiments of the disclosed subject matter.
FIG. 2 shows a perspective view of an interior of the front cover depicted in FIG. 1 in accordance with some embodiments of the disclosed subject matter.

FIG. 1 shows a perspective view of an exterior of a front cover 100 of a case for protecting and mounting a personal electronic device having a camera in accordance with some embodiments of the disclosed subject matter. As shown in FIG. 1, front cover 100 can include a frame 102 that protects a screen and/or the sides of a personal electronic device, such as a smartphone or other suitable mobile device. Frame 102 can be made from any suitable material. For example, in some embodiments, frame 102 can be impact resistant plastic, which can be transparent, translucent, or opaque. As another example, in some embodiments, frame 102 can be molded rubber. As yet another example, in some embodiments, frame 102 can be made from a combination of materials. In some embodiments, frame 102 can be coupled to a screen protector 104 which can contact a surface of a touchscreen of a personal electronic device, which can facilitate use of the touchscreen while the personal electronic device is enclosed in a protective case comprising front cover 100. In some embodiments, screen protector 104 can be any suitable material and can be coupled to frame 102 using any suitable technique or combination of techniques. For example, screen protector 104 can be made from an impermeable flexible material. As another example, screen protector 104 can be made from an impermeable less flexible material (e.g., a hard plastic material), which may or may not contact the touchscreen of a personal electronic device. In some embodiments, screen protector 104 can provide protection for a screen of a personal electronic device from water, dirt, debris, etc. Additionally, in some embodiments, screen protector 104 can provide impact resistance for a screen of a personal electronic device, such as in cases where screen protector 104 is an impact resistant material.

In some embodiments, an edge of frame 102 can be raised with respect to screen protector 104, which can protect a screen of a personal electronic device that is enclosed in a protective case comprising front cover 100 if the personal electronic device is dropped or otherwise impacts a hard surface. Additionally or alternatively, in some embodiments, an edge of frame 102 can be even with a surface of screen protector 104. For example, when screen protector 104 is an inflexible material, screen protector 104 can provide protection for a screen of a personal electronic device from drops or other impacts with hard surfaces.

In some embodiments, front cover 100 can include one or more push buttons 106. In some embodiments, push buttons 106 (described below in connection with FIG. 5) can facilitate the actuation of one or more buttons of a personal electronic device enclosed in a protective case comprising front cover 100. In some embodiments, push button 106 can inhibit water and/or other environmental contaminants from entering a case comprising front cover 100 and potential damaging a personal electronic device included in the case, while allowing a user to actuate certain buttons of the personal electronic device. In some embodiments, a first push button 106-1 can be used to actuate a lock/power button of a personal electronic device that is included in a case comprising font cover 100, and a second push button 106-2 can be used to actuate a button that controls image capture by the personal electronic device (e.g., such as a volume button of an APPLE IPHONE).

In some embodiments, front cover 100 can include one or more hooks 108, which can facilitate engagement with a back cover. Hooks 108 can have any suitable shape and can be any suitable size. As described below in connection with FIG. 7, hooks 108 can engage with one or more elongate members on a back cover to form a hinge that connects the front cover to the back cover.

In some embodiments, front cover 100 can include one or more protrusions 110 which can include an aperture through which a fastening device can be passed. In some embodiments, the aperture of protrusions 110 can be threaded or unthreaded. As shown in FIG. 1, in some embodiments, a fastener 112 can pass through the apertures of protrusions 110 and can be secured using any suitable mechanism, such as by a nut 114 (e.g., an acorn nut). Note that, in some embodiments, fastener 112 can include threads along any suitable portion of a body of fastener 112, which can engage with threads in nut 114 and/or with threads in one or more apertures of protrusions 110. Additionally, in some embodiments, nut 114 can be omitted in cases in which protrusions 110 include threads and/or where any other mechanism is provided for securing fastener 112 (e.g., such as a hitch pin).

FIG. 2 shows a perspective view of an interior of front cover 100 of a case for protecting and mounting a personal electronic device having a camera in accordance with some embodiments of the disclosed subject matter. As shown in FIG. 2, front cover 100 can include one or more hooks 202. As described below in connection with FIGS. 8 and 9, hooks 202 can be used in securing front cover 100 to a back cover to form a case for protecting and mounting a personal electronic device having a camera in accordance with some embodiments of the disclosed subject matter.

In some embodiments, front cover 100 can include a lanyard ring 204. Lanyard ring 204 can be used to attach a lanyard to front cover 104, which can facilitate attachment to a body of a user and/or can facilitate secure and convenient carrying.

In some embodiments, front cover 100 can include front cushions 206 around a perimeter of the interior of front cover 100. In some embodiments, front cushions 206 can be made from any suitable material, such as rubber. In some embodiments, front cushions 206 can be disposed on the interior of front cover 100 such that when a personal electronic device is inserted into front cover 100, front cushions 206 are situated between frame 102 and sides of the personal electronic device. In such embodiments, a screen of the personal electronic device can be flush against the interior of screen protector 104. Additionally or alternatively, in some embodiments, at least a portion of front cushions 206 can be disposed on the interior of front cover 100 such that when a personal electronic device is inserted into front cover 100, at least the portion of front cushions 206 are situated between screen protector 104 (or a portion of frame 102 surrounding screen protector 104) and a screen of the personal electronic device. In some embodiments, front cushions 206 can provide shock absorption and/or impact resistance for a personal electronic device that is enclosed in a case comprising front cover 100.

In some embodiments, front cover 100 can include any suitable number of front cushions 206. For example, as shown in FIG. 2, front cover 100 can include two front cushions 206 per side (including two front cushions 206 that are hidden from view) for a total of eight front cushions. Additionally or alternatively, in some embodiments, front cover 100 can include one front cushion 206 that surrounds an electronic device disposed within front cover 100, one front cushion 206 per side that extends substantially along the length of each side, or more than two front cushion 206 on one or more sides of front cover 100.

Figure 3:
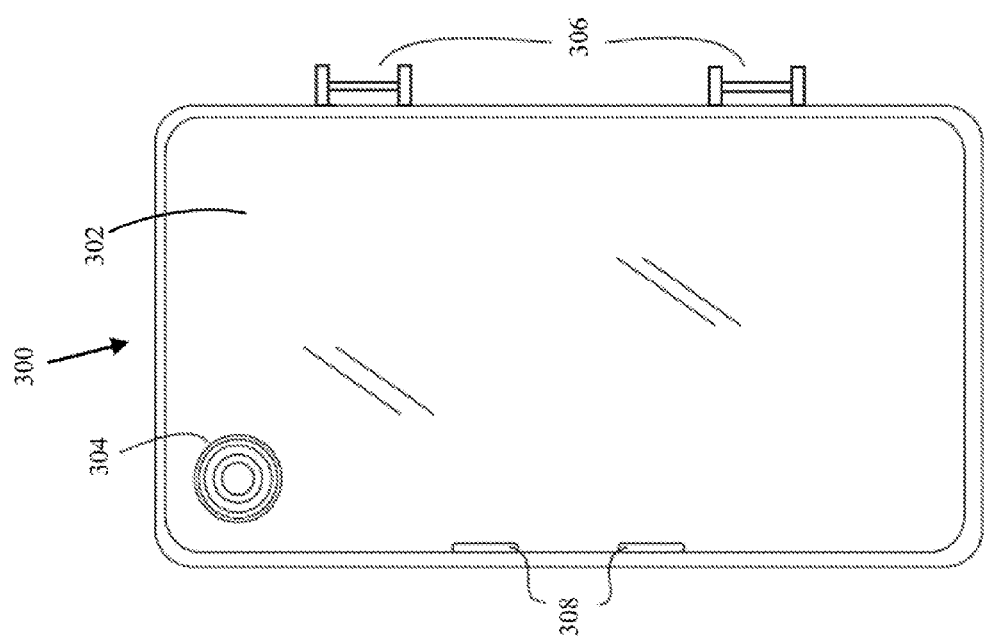
FIG. 3 shows a perspective view of an exterior of a rear cover of a case for protecting and mounting a personal electronic device having a camera in accordance with some embodiments of the disclosed subject matter.

FIG. 3 shows a perspective view of an exterior of a rear cover 300 of a case for protecting and mounting a personal electronic device having a camera in accordance with some embodiments of the disclosed subject matter. As shown in FIG. 3, rear cover 300 can include a panel 302 that protects a rear surface of a personal electronic device, such as a smartphone or other mobile device. Panel 302 can be made from any suitable material. For example, panel 302 can be impact resistant plastic, which can be transparent, translucent, or opaque. As another example, in some embodiments, panel 302 can be molded rubber. As yet another example, in some embodiments, panel 302 can be made from a combination of materials.

In some embodiments, rear cover 300 can include a camera aperture 304. Camera aperture 304 can facilitate the transmission of light to a camera of a personal electronic device that is disposed within a case that includes rear cover 300. Additionally, in some embodiments, a lens and/or other optical element can be placed in camera aperture 304 which can inhibit water and/or other environmental contaminants from entering a case comprising rear cover 300 and potential damaging a personal electronic device included in the case, while allowing light to enter a camera of the personal electronic device.

In some embodiments, rear cover 300 can include one or more elongate members 306. Elongate members 306 can be coupled to rear cover 300 using any suitable technique or combination of techniques and can be any suitable shape and/or size. As described above, elongate members 306 can engage with hooks 108 to form a hinge. Such a hinge can facilitate the closure of a case comprising front cover 100 and rear cover 300. Note that although front cover 100 is described herein as including hooks 108 and rear cover 300 is described as including elongate members 306, the position of these elements can be switched such that front cover 100 includes elongate members 306 and rear cover 300 can include hooks 108. Further, note that one or more hooks 108 and one or more elongate members 306 can be provided on each of front cover 100 and rear cover 300, such that each cover includes both at least one hook 108 and at least one elongate member 306. Additionally, the combination of hooks 108 and elongate members 306 to provide for the attachment of front cover 100 and rear cover 300 is merely an example, and front cover 100 can be attached to rear cover 300 using any suitable technique or combination of techniques. In some embodiments, rear cover 300 can include one or more slots 308 which can provide an anchor position for a latch that can be used to securely connect rear cover 300 to front cover 100 (e.g., as described below in connection with FIGS. 7-9).

Figure 4:
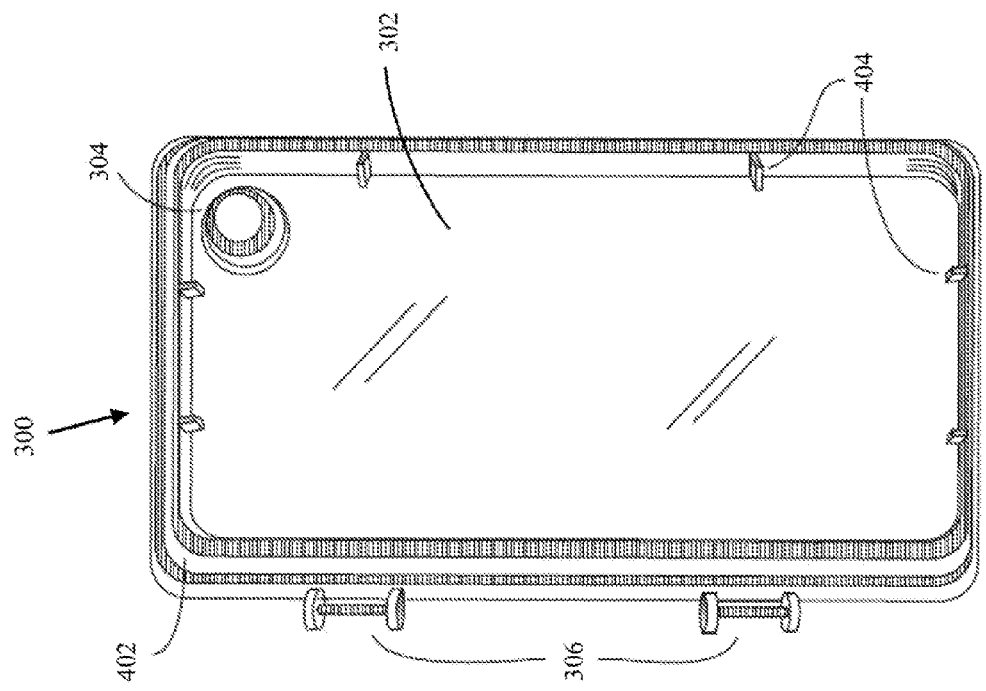
FIG. 4 shows a perspective view of an interior of the rear cover depicted in FIG. 3 in accordance with some embodiments of the disclosed subject matter.

FIG. 4 shows a perspective view of an interior of rear cover 300 of a case for protecting and mounting a personal electronic device having a camera in accordance with some embodiments of the disclosed subject matter. As shown in FIG. 4, rear cover 300 can include a ridge 402 which can be raised above an interior of panel 302. Ridge 402 can be any suitable material or combination of materials. For example, ridge 402 can include an impermeable ring that can form a water-tight seal with a surface of front cover 100. For example, the ring can be a silicon O-ring that is deposed between rear cover 300 and front cover 100.

In some embodiments, rear cover 300 can include rear cushions 404 around a perimeter of the interior of rear cover 300. In some embodiments, rear cushions 404 can be made from any suitable material, such as rubber. In some embodiments, rear cushions 404 can be disposed on the interior of panel 302 and/or ridge 402 of rear cover 300 such that when a personal electronic device is inserted into front cover 100 and rear cover 300 is engaged with front cover 100, rear cushions 404 are situated between the interior side of panel 302 and the personal electronic device. In some embodiments, rear cushions 404 can provide shock absorption and/or impact resistance for a personal electronic device that is enclosed in a case comprising rear cover 300.

In some embodiments, rear cover 300 can include any suitable number of rear cushions 404. For example, as shown in FIG. 4, rear cover 300 can include two rear cushions 404 per side (including two rear cushions 404 that are hidden from view) for a total of eight rear cushions. Additionally or alternatively, in some embodiments, rear cover 300 can include one rear cushion 404 that abuts ridge 402 on all sides, one rear cushion 404 per side that extends substantially along the length of each side, or more than two rear cushions 404 on each of one or more sides of rear cover 300.

FIG. 5 shows a cross-sectional view of a push button 106 in accordance with some embodiments of the disclosed subject matter. As shown in FIG. 5, push button 106 can include a housing 502. In some embodiments, button 106 can be pre-assembled and housing 502 can be secured in an aperture through frame 102. Housing 502 can be made from any suitable components and/or materials such that when secured into frame 102, a water-tight seal is provided between an interior surface and exterior surface of frame 102.

In some embodiments, housing 502 can include a plunger 504 which can be secured in housing 502 using any suitable technique or combination of techniques. Plunger 504 can be depressed from a resting position, which can in turn cause a pin 506 to be actuated toward an interior of front cover 100. When a personal electronic device is disposed on the interior of front cover 100, pin 506 can depress a button on the personal electronic device, activating any suitable function associated with that button.

In some embodiments, a membrane 508 can be disposed between plunger 504 and pin 506. Membrane 508 can be made from any suitable material and can be secured in housing 502 using any suitable technique or combination of techniques. For example, membrane 508 can be an elastic silicon material that provides a waterproof barrier between plunger 504 and pin 506, while allowing plunger 504 to be actuated toward pin 506. Additionally, in some embodiments, a bias spring 510 can be disposed between membrane 508 and an interior surface of housing 502. Bias spring 510 can, in some embodiments, cause pin 506 and/or plunger 504 to be returned to an original position after plunger 504 is actuated and released.

FIG. 6 shows a cross sectional view of camera aperture 304 with optics placed within aperture 304 in accordance with some embodiments of the disclosed subject matter. As shown in FIG. 6, optics 602 having a first end 604 and a second end 606 can be secured within aperture 304. In some embodiments, optics 602 can include one or more lenses, which can have any suitable properties for gathering and/or focusing light on an image sensor of a camera included in a personal electronic device enclosed in a case comprising rear cover 300. Additionally or alternatively, optics 602 can include be a window for passing light from an exterior of rear cover 300 to an interior of rear cover 300.

In some embodiments, optics 602 can be permanently affixed within aperture 304 using any suitable technique or combination of techniques. Additionally or alternatively, in some embodiments, optics 602 can be removably affixed within aperture 304. For example, in some embodiments, optics 602 can include (or can be combined with) a washer and/or gasket 608 which can abut an exterior of panel 302. Washer/gasket 608 can, in some embodiments, provide a water-tight seal between optics 602 and rear cover 300. As another example, in some embodiments, a ring nut 610 can engage with threads on optics 602 (and/or rear cover 300) to secure optics 602 within aperture 304. In such an example, tightening ring nut 610 can cause a seal between washer/gasket 608 and panel 302 to be formed. In some embodiments, second end 606 of optics 602 can abut a camera and/or surface of a personal electronic device enclosed in a case comprising rear cover 300.

FIG. 7 shows a perspective view of front cover 100 and rear cover 300 in proximity to one another in accordance with some embodiments of the disclosed subject matter. As shown in FIG. 7, hooks 108 and elongate members 306 can be configured to engage with one another such that elongate members 306 can be inserted into hooks 108 to form a hinge around which front cover 100 and/or back cover 300 can be rotated to enclose a personal electronic device.

FIG. 8A shows a perspective view of a toggle hook latch 800 for securely enclosing a personal electronic device within front cover 100 and back cover 300 in accordance with some embodiments of the disclosed subject matter. As shown in FIG. 8, latch 800 can include a push toggle 802 and a hook 804. In some embodiments, hook 804 can be rotatably coupled to push toggle 802, and push toggle 802 can be rotatably coupled with hooks 202.

FIG. 8B shows a second perspective view of toggle hook latch 800 in accordance with some embodiments. As shown in FIG. 8B, a lip 806 of hook 804 can engage with an edge of rear cover 300, while a clasp of push toggle 802 can engage with an edge of front cover 100. In some embodiments, a protrusion from hook 804 can rest within one or more slots 308 to provide an anchor for hook 804.

FIG. 9 shows an exploded view of latch 800 in accordance with some embodiments of the disclosed subject matter. As shown in FIG. 9, one or more protrusions 902 extending from hook 804 can engage with one or more corresponding depressions 904 in push toggle 802 to provide an interconnection between hook 804 and push toggle 802. In some embodiments, push toggle 802 can include one or more elongate members 906 which can engage with hooks 202 of front cover 100 to provide a fulcrum around which push toggle 802 can rotate to secure front cover 100 and rear cover 300 to form a case for a personal electronic device having a camera. Although a toggle hook latch is generally described herein for securing front cover 100 and rear cover 300, this is merely an example, and other mechanisms for securing front cover 100 and rear cover 300 can be used without departing from the spirit and scope of the invention.

FIG. 10 shows a mounting assembly 1000 for mounting a personal electronic device having a camera in accordance with some embodiments of the disclosed subject matter. As shown in FIG. 10, mounting assembly 1000 can include a neck portion 1002 and a base portion 1004, which can be interconnected and/or integrally formed. In some embodiments, neck portion 1002 can include an aperture 1006 for receiving fastener 112. As shown in FIG. 10, in some embodiments, one or more positioning members can be disposed near aperture 1006 and can engage with a corresponding positioning member on front cover 100 (e.g., as described below in connection with FIG. 18).

In some embodiments, base portion 1004 can include one or more slots 1008 which can engage with corresponding tabs on a mounting pad (e.g., as described below in connection with FIGS. 13-16). In some embodiments, slots 1008 can have any suitable shape and/or configuration. For example, as shown in FIG. 10, slots 1008 can be formed as an elongate space with a trapezoidal cross-section within base portion 1004, with a narrower side of the two parallel sides of the trapezoid forming an opening on a relatively larger side of base portion 1004. Note that slots 1008 can have any suitable shape, and the shape described herein is merely an example.

In some embodiments, base portion 1004 can include a hollow portion 1010 which can house a lever 1012. FIG. 11 shows a partial view of base portion 1004 with details of lever 1012 in accordance with some embodiments of the disclosed subject matter. As shown in FIG. 11, lever 1012 can include a handle 1102 and an elongate portion 1104. In some embodiments, handle 1102 can be coupled to a first end of elongate portion 1104, which can be disposed within hollow portion 1010 and can be coupled to base portion 1004 by a fastener 1106 at a second end. In such an embodiment, the coupling of elongate portion 1104 to base portion 1004 at the second end can facilitate rotation of handle 1102 which can cause a mounting pin assembly 1108 to move in a direction substantially perpendicular to a longitudinal axis of hollow portion 1010. As described below in connection with FIGS. 12 and 13, mounting pin assembly 1108 can facilitate movement of the mounting pin through an aperture (illustrated by dashed line 1110 in FIG. 10) in a mounting surface of base portion 1004 and allow for mounting assembly 1000 to be securely coupled to a mounting pad when the mounting pin is engaged with a corresponding aperture in the mounting pad (e.g., due to a bias provided by mounting pin assembly 1108). Similarly, rotating lever 1104 by operating handle 1102 can facilitate decoupling of mounting assembly 1000 and the mounting pad. Note that fastener 1106 is merely shown as an example, and lever 1012 can be coupled to base portion 1004 using any suitable technique or combination of techniques.

FIG. 12 shows an exploded view of mounting pin assembly 1108 in accordance with some embodiments of the disclosed subject matter. As shown in FIG. 12, mounting pin assembly 1108 can include a mounting pin 1202, which can be secured to lever 1104 via a fastener 1204. In some embodiments, fastener 1204 can also secure a bias member 1206 to lever 1104. In some embodiments, bias member 1206 can be any include any suitable material and can be configured using any suitable technique or combination of techniques. As shown in FIGS. 11 and 12, bias member 1206 can provide a bias to cause lever 1104 and mounting pin 1202 toward a side of hollow 1010 that is parallel to a mounting surface of base portion 1004. As described above in connection with FIG. 11, this can facilitate engagement of mounting pin 1202 with an aperture of a mounting pad, while also facilitating decoupling of mounting assembly 1000 and the mounting pad. In some embodiments, bias member 1206 can provide any suitable amount of biasing force to lever 1104 and mounting pin 1202 such that mounting pin 1202 normally protrudes from aperture 1110, but can be conveniently overcome by operation of handle 1102.

FIG. 13 shows a perspective view of a mounting pad 1300 in accordance with some embodiments of the disclosed subject matter. As shown in FIG. 13, mounting pad 1300 can have a surface 1302 that, when mounting assembly 1000 is coupled to mounting pad 1300, is substantially parallel to a mounting surface of base portion 1004. In some embodiments, mounting pad 1300 can include one or more tabs 1304 which engage with slots 1008 when mounting assembly 1000 is coupled to mounting pad 1300.

In some embodiments, mounting pad 1300 can include an aperture 1306, which may or may not extend through mounting pad 1300. As described above, when mounting assembly 1000 is coupled to mounting pad 1300, mounting pin 1202 can engage with aperture 1306 to securely couple mounting assembly 1000 and mounting pad 1300.

FIG. 14 shows a perspective view of an example 1400 of a second surface 1402 of mounting pad 1300 in accordance with some embodiments of the disclosed subject matter. As shown in FIG. 14, second surface 1402 can be covered in an adhesive, which can facilitate coupling of mounting pad 1300 to a surface, such as a helmet, surfboard, dashboard, windshield, and/or any other suitable surface. In some embodiments, any other suitable technique can be used to couple mounting pad 1300 to a surface, such as a suction cup, fasteners, etc.

FIG. 15 shows a perspective view of an example 1500 of a second surface of mounting pad 1300 in accordance with some embodiments of the disclosed subject matter. As shown in FIG. 15, second surface 1502 can be coupled to a fitting 1504. As shown in FIG. 15, fitting 1504 can have external threads and one or more slits that run substantially perpendicular to surface 1502.

FIG. 16 shows a perspective view of a pole mount assembly 1600 in accordance with some embodiments of the disclosed subject matter. As shown in FIG. 16, pole mount assembly 1600 can include an upper portion 1602 and a lower portion 1604. In some embodiments, upper portion 1602 and lower portion 1604 can be fastened around any suitable elongate structure, such as a pole, bicycle handlebars, etc. Upper portion 1602 and lower portion 1604 can be coupled via one or more fasteners 1606, which can be tightened using nuts 1608.

In some embodiments, upper portion 1602 can be coupled to a bolt 1610. In some embodiments, bolt 1610 can be disposed such that the edges of bolt 1610 engage with interior edges of fitting 1504. Any suitable technique or combination of techniques can be used to secure bolt 1610 within fitting 1504. For example, bolt 1610 can include one or more protruding ridges, which can engage with one or more grooves on an interior portion of fitting 1504. Note that, in some embodiments, bolt 1610 can be coupled to mounting pad 1300 and fitting 1504 can be coupled to upper portion 1602 of pole mount assembly 1600.

Figure 17:
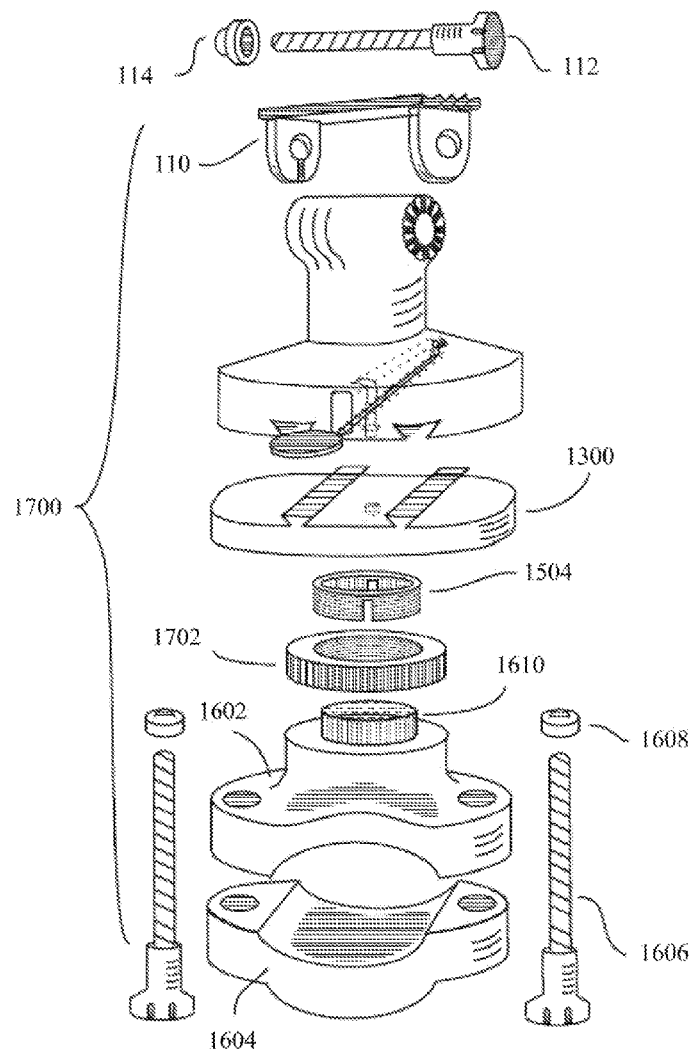
FIG. 17 shows an exploded view illustrating an operative relationship among the front cover depicted in FIGS. 1 and 2, the mounting assembly depicted in FIG. 10, the mounting pad depicted in FIG. 13 and the pole mount assembly depicted in FIG. 16 for mounting a personal electronic device having a camera in accordance with some embodiments of the disclosed subject matter.

FIG. 17 shows an exploded view illustrating operative relationship among front cover 100, mounting assembly 1000, mounting pad 1300 and pole mount assembly 1600 for mounting a personal electronic device having a camera in accordance with some embodiments of the disclosed subject matter. As shown in FIG. 17, in some embodiments, protrusion 110 of front cover 100 can be coupled to neck portion 1002 of mounting assembly 1000 via fastener 112 and nut 114. Base portion 1004 can be coupled to base pad 1300 via slots 1008 and secured using mounting pin 1202 (not labeled in FIG. 17). Fitting 1504 can be coupled to both pad 1300 and bolt 1610. A position of fitting 1504 can be secured with respect to bolt 1610 by tightening a ring nut 1702 which can cause the slits in fitting 1504 to narrow pressing the interior of fitting 1504 to the exterior of bolt 1610. In some embodiments, the threads of ring nut 1702 can be tapered to cause the compression of fitting 1504 around bolt 1610. The combination of fitting 1504, bolt 1610 and ring nut 1702 can, in some embodiments, facilitate rotation of mounting pad 1300 (and consequently rotation of any mounting assembly coupled to mounting pad 1300) with respect to pole mount 1600 (and/or any other hardware having a bolt 1610 or the like) by loosening ring nut 1702, rotating mounting pad 1300, and re-tightening ring nut 1702.

Figure 18:
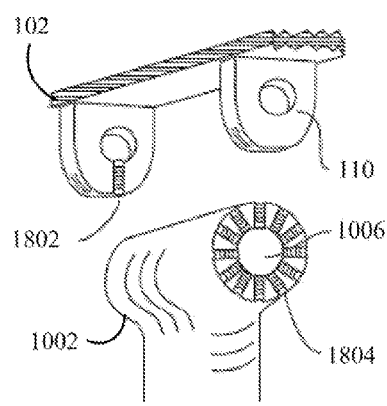
FIG. 18 shows a perspective view of protrusions of the front cover depicted in FIGS. 1 and 2, and the neck portion of the mounting assembly depicted in FIG. 10 in accordance with some embodiments of the disclosed subject matter.

FIG. 18 shows a perspective view of protrusions 110 of front cover 100 and neck portion 1002 of mounting assembly 1000 in accordance with some embodiments of the disclosed subject matter. As shown in FIG. 18, protrusions 110 can have one or more ridges 1802 which can engage with one or more depressions 1804 in neck portion 1002. In some embodiments, a user can position protrusions 110 at a desired angle with respect to neck portion 1002 by sliding protrusions 110 over neck portion 1002 such that ridges 1802 engage a particular depression 1804 and an aperture in protrusion 110 is aligned with aperture 1006. In some embodiments, front cover 100 can then be secured to mounting assembly 1000 at the desired angle by inserting fastener 112 and tightening nut 114. Although ridges 1802 and depressions 1804 are described herein as being part of protrusions 110 and neck portion 1002 respectively, this is merely an example, and any suitable technique or combination of techniques can be used to securely position front cover 100 at a desired angle with respect to mounting assembly 1000.

Figures 19, 20:
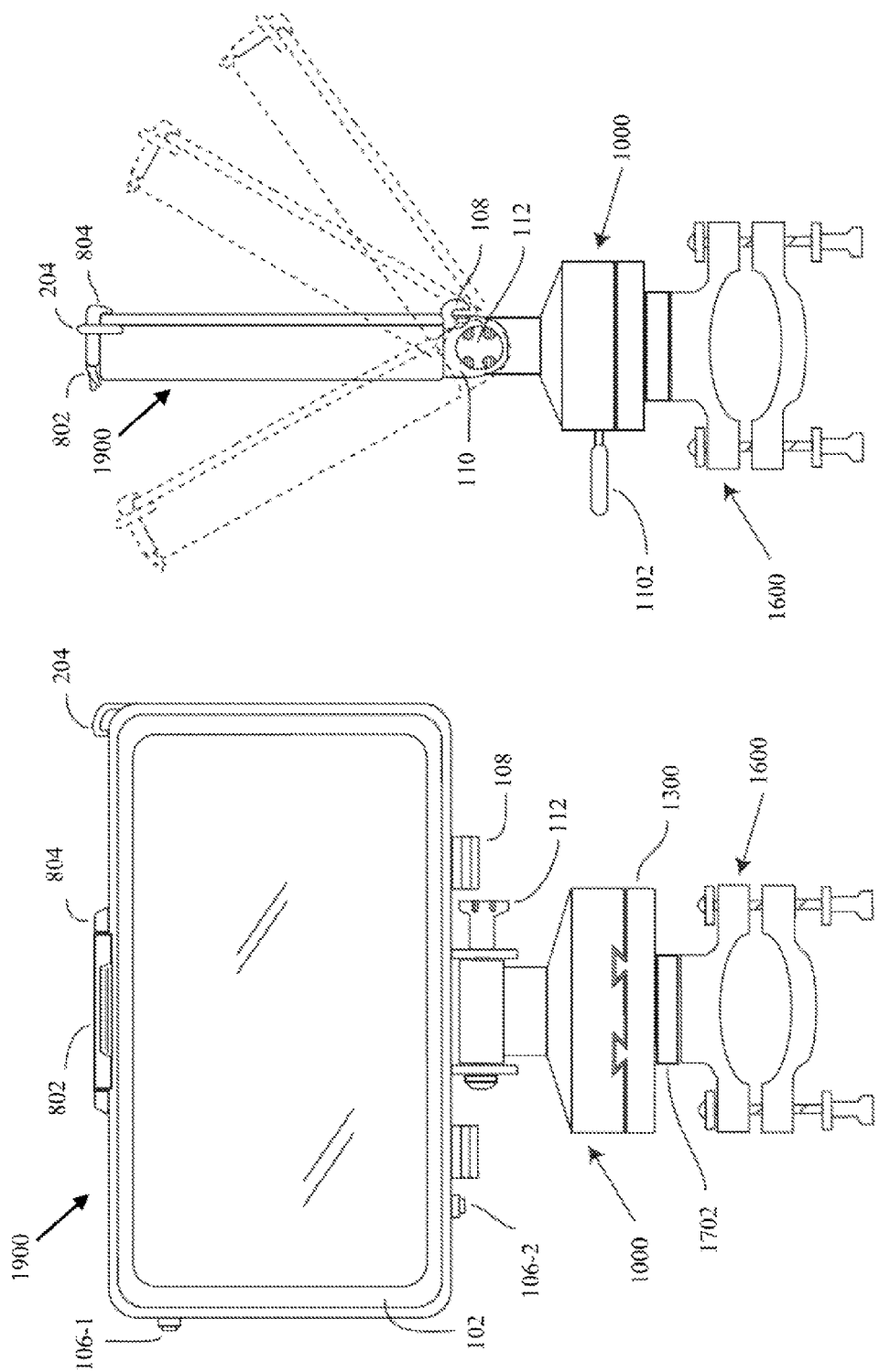
FIG. 19 shows an elevation view of a case coupled to the mounting assembly depicted in FIG. 10, the mounting pad depicted in FIG. 13 and the pole mount assembly depicted in FIG. 16 in accordance with some embodiments of the disclosed subject matter.
FIG. 20 shows an elevation view of the case depicted in FIG. 19 coupled to the mounting assembly depicted in FIG. 10, the mounting pad depicted in FIG. 13 and the pole mount assembly depicted in FIG. 16 in which the mounting assembly and case are rotated ninety degrees with respect to the pole mount assembly compared to the view depicted in FIG. 19 in accordance with some embodiments of the disclosed subject matter.

FIG. 19 shows an elevation view of a case 1900 coupled to mounting assembly 1000, mounting pad 1300 and pole mount assembly 1600 in accordance with some embodiments of the disclosed subject matter.

FIG. 20 shows an elevation view of case 1900 coupled to mounting assembly 1000, mounting pad 1300 and pole mount assembly 1600 and in which mounting assembly 1000 and case 1900 are rotated ninety degrees with respect to pole mount assembly 1600 compared to the view depicted in FIG. 19 in accordance with some embodiments of the disclosed subject matter. In accordance with some embodiments, dashed lines in FIG. 20 represent tilting of case 1900 around neck portion 1002 of mounting assembly 1000. In some embodiments, case 1900 can be rotated about an axis parallel to an axis of bolt 1610 (not shown) through any suitable angle. For example, by alternately loosening and tightening ring nut 1702, case 1900, mounting assembly 1000 and mounting pad 1300 can be rotated through 360 degrees to any desired angle around the axis (e.g., as described above in connection with FIG. 17). Additionally, in some embodiments, case 1900 can be tilted about an axis parallel to an axis of aperture 1006 (not shown) through any suitable position with respect to mounting assembly 1000 (e.g., as described above in connection with FIG. 18).

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, apparatus for protecting and mounting a personal electronic device having a camera are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. An apparatus for protecting and mounting a personal electronic device having a camera, the apparatus comprising:
   a case comprising:
      a front cover comprising:
         a frame having an exterior and an interior;
         a screen protector coupled to the frame such that when the personal electronic device is positioned within the frame, the screen protector contacts a touchscreen of the personal electronic device;
         a first plurality of cushions disposed on the interior of the frame such that when the personal electronic device is positioned within the frame, the first plurality of cushions contact the sides of the personal electronic device; and
         a protrusion that extends from one side of the exterior of the frame, wherein the protrusion has an aperture; and
      a rear cover comprising:
         a panel having an exterior surface and an interior surface;
         a ridge extending from the interior surface of the panel such that the ridge engages the interior of the frame when the front cover is operatively coupled to the back cover;
         a second plurality of cushions disposed on the interior surface of the panel such that when the personal electronic device is positioned within the frame and the front cover is operatively coupled to the back cover, the second plurality of cushions contact a surface of the personal electronic device that is opposite the touchscreen;
         an aperture extending through the panel from the exterior surface to the interior surface; and
         optics disposed within the aperture such that the camera of the personal electronic device is substantially aligned with the optics when the personal electronic device is positioned within the frame; and
   a mounting assembly comprising:
      a neck portion having an aperture that is used to couple the front cover to the neck portion via a fastener inserted through the aperture of the protrusion and the aperture of the neck portion;
      a base portion having a mounting surface and an elongate slot in the mounting surface;
      a hollow portion extending from an exterior of the base portion into an interior of the base portion; and
      a lever disposed at least partially within the hollow portion.

2. The apparatus of claim 1, wherein the base portion has an aperture that extends from the interior of hollow portion to the exterior of the mounting surface, wherein the mounting assembly further comprises a pin coupled to the lever and extending at least partially through the aperture that extends from the interior of the hollow portion to the exterior of the mounting surface.

3. The apparatus of claim 2, wherein the lever and pin are biased such that in a resting position, an end of the pin that is distal from the lever extends past the mounting surface.

4. The apparatus of claim 1, wherein a cross-sectional shape of the elongate slot is trapezoidal with a narrow side of the parallel sides of the trapezoid at the mounting surface.

5. The apparatus of claim 1, wherein the protrusion comprises one or more ridges extending radially from the aperture of the protrusion, and wherein the neck portion comprises one or more depressions that engage the one or more ridges when the case is coupled to the mounting assembly.

6. The apparatus of claim 1, wherein the front cover further comprises a push button extending through the frame, wherein the push button comprises:
   a housing;
   a plunger disposed at least partially within the housing and extending above the exterior of the frame;
   a pin disposed at least partially within the housing such that actuating the plunger causes the pin to extend in a direction toward the interior of the frame; and
   a membrane disposed within the housing between the plunger and the pin, wherein the membrane is coupled to the housing such that the membrane forms a water-tight barrier between the plunger and the pin.

7. The apparatus of claim 1, wherein the ridge comprises a silicon O-ring.

8. The apparatus of claim 1, wherein the front cover further comprises a hook and the rear cover further comprises an elongate member coupled to the rear cover such that a longitudinal axis of the elongate member is parallel to a longitudinal axis of the back cover, and wherein the hook engages the elongate member to form a hinge.

9. The apparatus of claim 1, wherein the front cover further comprises a hook, and wherein the case further comprises a toggle hook latch that engages the hook and secures the front cover to the back cover.

10. The apparatus of claim 1, further comprising a mounting pad having an elongate tab with a cross-sectional shape that matches at least a portion of the cross-sectional shape of the elongate slot such that when the elongate tab is positioned within the elongate slot the mounting pad is secured to the base portion of the mounting assembly with respect to a force on the mounting apparatus in a direction perpendicular to the mounting surface of the mounting assembly.

11. The apparatus of claim 10, wherein the mounting pad comprises a mounting pin aperture such that the mounting pin rests within the mounting pin aperture when the mounting pad is operatively coupled to the mounting assembly.

12. The apparatus of claim 10, wherein the mounting pad is coupled to a fitting having a threaded exterior surface and an interior surface, wherein a slot extending from the exterior surface to the interior surface runs substantially perpendicular to the threads from an end of the fitting that is distal from the mounting pad toward the mounting pad.

13. The apparatus of claim 12, further comprising:
   a pole mount comprising:
      an upper portion comprising:
         a bolt; and
         an aperture;
      a lower portion comprising an aperture; and
      a fastener disposed through the aperture of the upper portion and the aperture of the lower portion.

14. The apparatus of claim 13, wherein the fitting is disposed such that the inter surface of the fitting surrounds at least a portion of the bolt, wherein the apparatus further comprises:
   a ring nut disposed on the threads of the exterior surface of the fitting, wherein tightening the ring nut decreases a width of the slot causing the interior surface of the fitting to securely engage the bolt.

15. The apparatus of claim 14, wherein with the ring nut loosened the case is rotatable around a central axis of the bolt.

16. The apparatus of claim 15, wherein the case is freely rotatable through three hundred and sixty degrees around the central axis of the bolt.

17. The apparatus of claim 1, wherein the case is configured to engage with the neck portion such that the case is securable at a plurality of angles around a longitudinal axis of the aperture of the neck portion.

18. The apparatus of claim 17, wherein the case is securable at angles around the longitudinal axis of the aperture of the neck portion that differ by at least one hundred and eighty degrees.

19. The apparatus of claim 1, wherein the frame of the front cover further comprises a raised edge that causes the frame to be raised with respect to the screen protector that contacts the touchscreen of the personal electronic device.

* * * * *